(12) United States Patent
Yergenson et al.

(10) Patent No.: US 12,515,467 B2
(45) Date of Patent: Jan. 6, 2026

(54) CIRCULAR STRUCTURES FOR ROTATION OF BACKING RELATIVE TO BASE

(71) Applicant: Hewlett-Packard Development Company, L.P., Spring, TX (US)

(72) Inventors: Robin P. Yergenson, Boise, ID (US); Brian C. Mayer, Boise, ID (US); Alan Williamson, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 462 days.

(21) Appl. No.: 17/799,013

(22) PCT Filed: Feb. 13, 2020

(86) PCT No.: PCT/US2020/018048
§ 371 (c)(1),
(2) Date: Aug. 11, 2022

(87) PCT Pub. No.: WO2021/162693
PCT Pub. Date: Aug. 19, 2021

(65) Prior Publication Data
US 2023/0063445 A1 Mar. 2, 2023

(51) Int. Cl.
*B41J 29/04* (2006.01)
*F16C 11/04* (2006.01)
*G03G 15/00* (2006.01)

(52) U.S. Cl.
CPC ............ *B41J 29/04* (2013.01); *F16C 11/04* (2013.01); *G03G 15/5016* (2013.01); *Y10T 403/32581* (2015.01)

(58) Field of Classification Search
CPC ..... Y10T 403/32557; Y10T 403/32581; Y10T 403/32967; Y10T 403/32361; Y10T 403/32377; G03G 15/5016
See application file for complete search history.

(56) References Cited

U.S. PATENT DOCUMENTS

| | | | |
|---|---|---|---|
| 5,168,423 A | 12/1992 | Ohgami et al. | |
| 5,687,939 A * | 11/1997 | Moscovitch | ........... F16M 11/24 361/679.04 |
| 5,887,837 A | 3/1999 | Johns et al. | |
| 6,065,732 A | 5/2000 | Cho | |
| 6,105,919 A | 8/2000 | Min | |

(Continued)

FOREIGN PATENT DOCUMENTS

CN 102767679 A 11/2012

OTHER PUBLICATIONS

Darren allan, "Rotato flips your monitor screen around at the touch of a button", T3 Smarter Living, Retrieved at: https://www.t3.com/news/rotato-flips-your-monitor-screen-around-at-the-touch-of-a-button, Dec. 20, 2019, p. 1-3.

*Primary Examiner* — Michael P Ferguson
(74) *Attorney, Agent, or Firm* — Foley & Lardner LLP (57) ABSTRACT

A rotation base has a base circular structure. A display backing has a backing circular structure. The backing circular structure is rotatably attached to the base circular structure to permit the display backing to rotate between landscape and portrait orientations relative to the rotation base. One of the base and backing circular structures defines a slot. The other of the base and backing circular structures defines a tab rotatably disposed within the slot.

12 Claims, 11 Drawing Sheets

(56) References Cited

U.S. PATENT DOCUMENTS

| | | | |
|---|---|---|---|
| 6,189,842 B1 * | 2/2001 | Bergeron Gull | F16M 11/24 |
| | | | 248/283.1 |
| 6,443,408 B1 * | 9/2002 | Hung | F16M 11/2021 |
| | | | 248/176.1 |
| 6,446,913 B1 * | 9/2002 | Schroeder | F16M 13/02 |
| | | | 248/222.52 |
| 8,628,052 B2 * | 1/2014 | Lee | F16M 11/08 |
| | | | 403/111 |
| 8,953,224 B2 * | 2/2015 | Mok | H04N 1/00535 |
| | | | 358/401 |
| 9,220,177 B2 | 12/2015 | Hida | |
| 9,239,128 B2 * | 1/2016 | Hashimoto | G03G 21/1661 |
| 10,444,898 B2 * | 10/2019 | Toriyama | H04N 1/04 |
| 11,215,220 B2 * | 1/2022 | Kawabata | F16C 11/045 |
| 2012/0243042 A1 * | 9/2012 | Uchida | G03G 15/5016 |
| | | | 358/1.15 |
| 2014/0062860 A1 | 3/2014 | Lee et al. | |
| 2018/0011551 A1 | 1/2018 | Gothlin et al. | |

* cited by examiner

CIRCULAR STRUCTURES FOR ROTATION OF BACKING RELATIVE TO BASE

BACKGROUND

Printing devices include standalone printers as well as all-in-one (AIO) devices that have functionality like copying, faxing, and/or scanning functionality in addition to printing functionality. As printing devices have increased in complexity, their built-in user interfaces have become more sophisticated. Printing devices were initially, and less complex such devices still are, usually limited to hard buttons for providing input and light-emitting diodes (LEDs), seven-digit LED displays and liquid-crystal displays (LCDs), and/or one- or two-line LCDs for providing output. More modern printing devices can include flat panel displays, both color and monochromatic, of the type commonly found on laptop computers, and can rival the displays of such computers in size. The flat panel displays often include touchscreen functionality for providing input.

DETAILED DESCRIPTION

As noted in the background, printing devices can include flat panel displays, which may have touchscreen functionality. Some types of printing devices integrate the flat panel displays within their enclosures. Other types of printing devices have their flat panel displays mounted to bases extending from the enclosures. In these latter types of printing devices, the displays are sometimes akin to external monitors for desktop or laptop computers that have stands, but with the stands (viz., bases) affixed to the enclosures of the printing devices.

The displays of printing devices are often used in landscape, as opposed to portrait, orientation in the case in which the displays are rectangular but non-square in shape. As printing devices have become narrower in width to fit in a greater variety of physical spaces, among other reasons, and as their displays have become increasingly larger in size, configuration of a display in landscape orientation can result in the display overhanging one if not both sides of the printing device of which it is a part. The boxes in which the printing devices are shipped may therefore have to be sized correspondingly larger to accommodate the overhanging displays, which in turn can mean that fewer boxes can fit on a standard-sized shipping pallet, increasing per-device shipping cost. The printing device market is highly competitive and often cost-sensitive, and such increased shipping cost can serve as a barrier for success in the marketplace.

Decreasing display size so that there is no overhang can also be undesirable, however, for competitive reasons. Permanently attaching the displays in portrait instead of landscape orientation is also unrealistic. For instance, printing device software—both the internal software shipped with the printing devices as well as third-party solutions that can extend or customize printing device functionality—may be hardcoded to displays being configured in landscape orientation.

Techniques described herein ameliorate these and other issues by providing a rotational mating assembly that permits the display or other component of a printing device or other apparatus to rotate between landscape and portrait orientations about a base that may be extendably attached to an enclosure of the device. The printing device may ship within its box with the display in portrait orientation. During setup (and potentially during subsequent use as well), the display may be rotated to landscape orientation.

The rotational mating assembly can be lower in manufacturing cost than existing rotational mating assemblies found on external monitors for desktop and laptop computers. External monitors are often expected to be rotated between portrait and landscape orientations relatively frequently, and therefore may have relatively robust and thus relatively expensive such rotational mating assemblies. By comparison, the displays of printing devices may not be expected to be rotated between portrait and landscape orientations frequently, permitting the usage of the techniques described herein.

Figure 1:
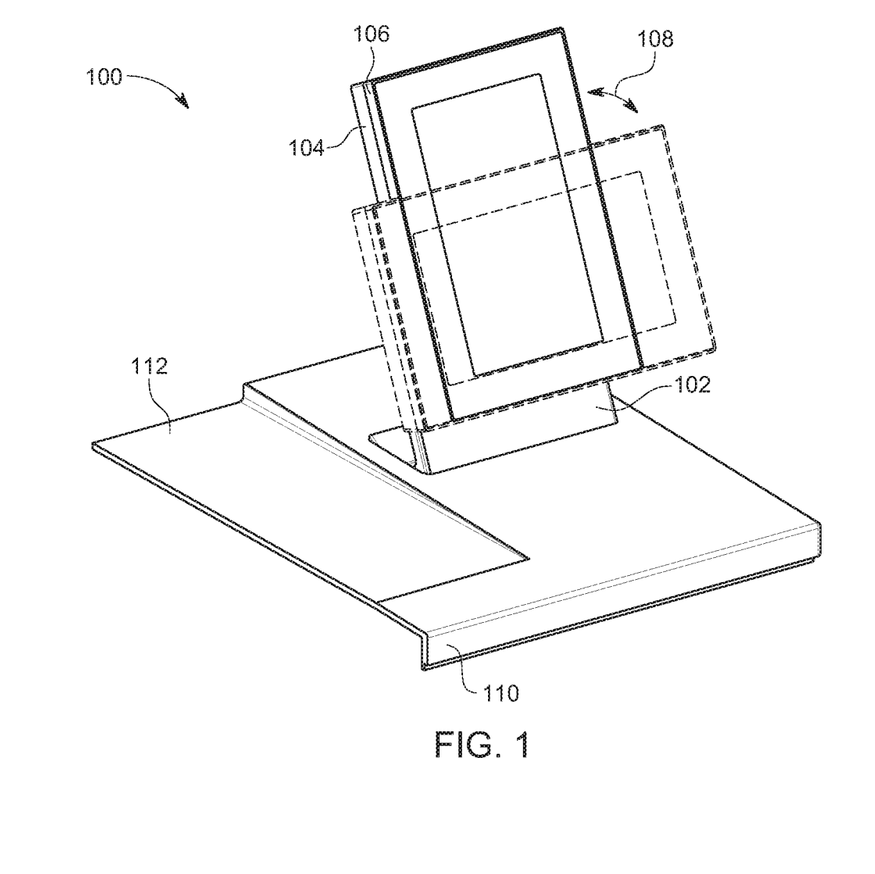
FIG. 1 is a diagram of a portion of an example printing device including a rotatable display.

FIG. 1 shows a portion of an example printing device 100. The printing device 100 may be a standalone printer or an all-in-one (AIO) device. The printing device 100 is more generally an apparatus. The printing device 100 includes a rotatable base 102 to which a display backing 104 is rotatably attached, permitting rotation of the backing 104 and thus a display 106 attached to the backing 100 between landscape and portrait orientations, as indicated by arrow 108.

The printing device 100 includes an enclosure 110, a portion of which is depicted in FIG. 1. The rotation base 102 is extendably attached to the enclosure 110 in that the base 102 extends from the enclosure 110 as opposed to being integrated within the enclosure 110. In the example of FIG. 1, the rotation base 102 is affixed off-center width-wise on the enclosure 110, and the display backing 104 and the display 106 overhang the right side of the enclosure 110 in the landscape orientation.

The printing device 100 can include an output tray 112 at a side of the enclosure 110 opposite the side at which the display backing 104 and the display 106 overhang the enclosure 110. The printing device 100 may output media sheets onto the output tray 112 after printing on the sheets. In the example of FIG. 1, the output tray 112 is integrated within the enclosure 110, being a surface of the enclosure 110 that ramps at an angle relative to another surface of the enclosure 110.

Figure 2A:
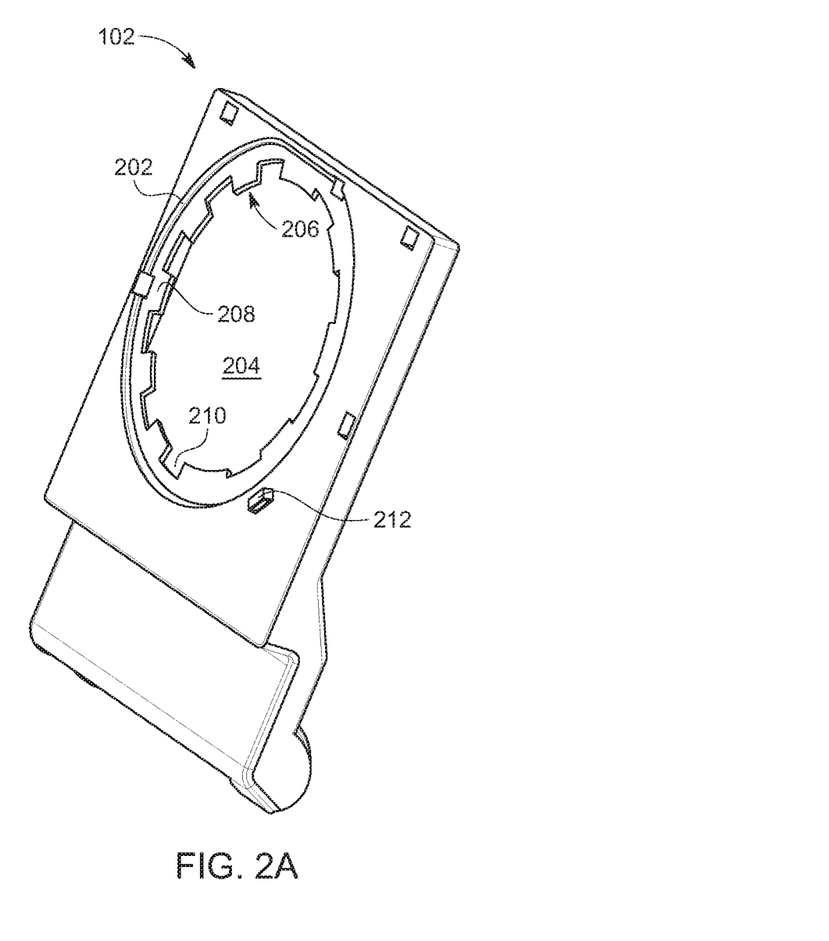
FIGS. 2A and 2B are diagrams of front and back views of an example rotation base having a base circular structure of a rotational mating assembly.
Figure 2B:
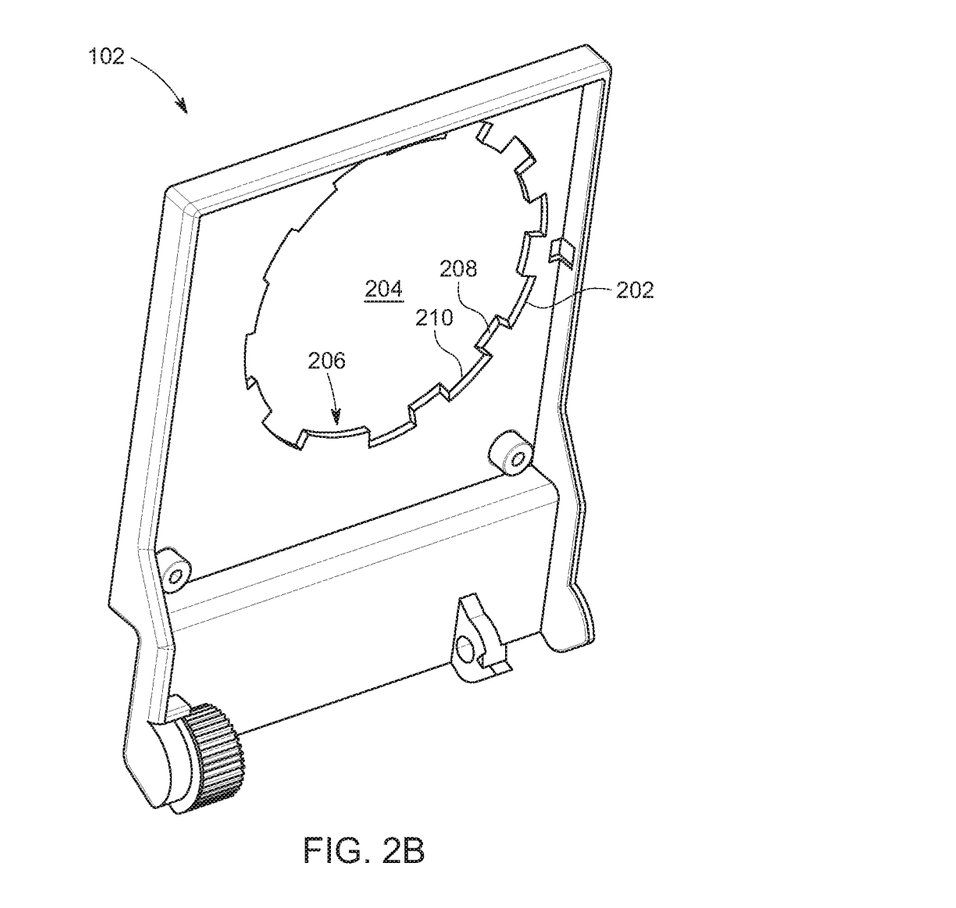

FIGS. 2A and 2B are diagrams of front and back views of the rotation base 102, respectively. The view of the rotation base 102 in FIG. 2A is a front view from the perspective of the front of the printing device 100 in FIG. 1 at which the display 106 is viewable. Similarly, the view of the rotation base 102 in FIG. 2B is a back view from the perspective of the back of the printing device 100 in FIG. 1, opposite the front.

The rotation base 102 includes a base circular structure 202 defined relative to a hole 204 within the base 102. The base circular structure 202 in turn defines a tab 206. The base circular structure 202 has multiple keys 208 separated by gaps 210 that can be referred to as key gaps. The keys 208 are organized in a circular formation about the hole 204 and are the part of the circular structure 202 that defines the tab 206. The keys 208 extend inward into the hole 204, and together constitute the tab 206.

The keys 208 and the gaps 210 can vary in size along the angular direction about the base circular structure 202. The keys 208 and the gaps 210 can also or instead vary in size along the radial direction perpendicular to the angular direction (i.e., along radial axes extending outwards from the origin or center of the base circular structure 202). The rotation base 102 can further include and define a protrusion 212 extending outwards from the base 102.

Figure 3A:
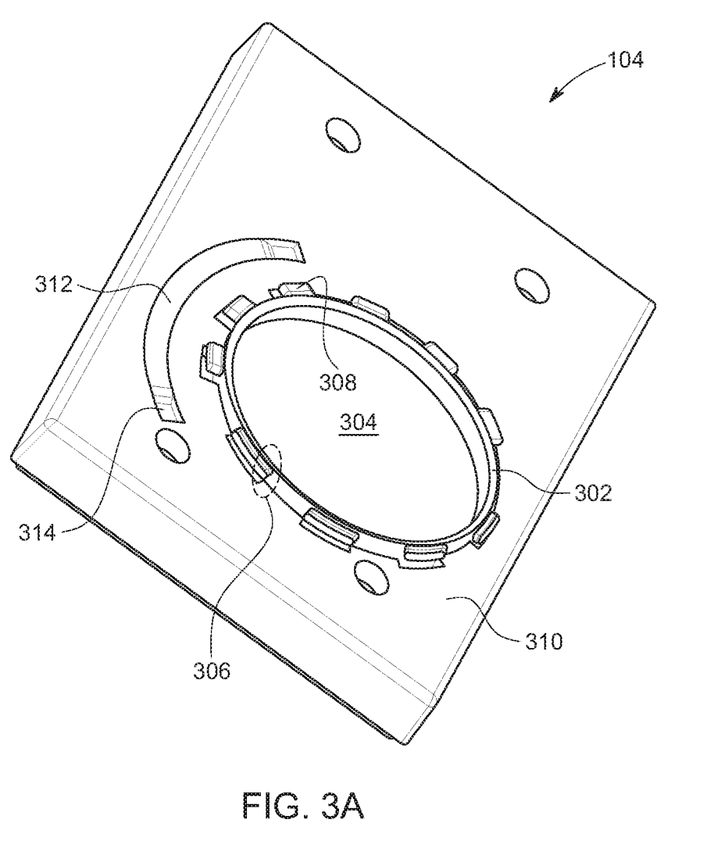
FIGS. 3A and 3B are diagrams of back and front views of an example backing having a backing circular structure of a rotational mating assembly.
Figure 3B:
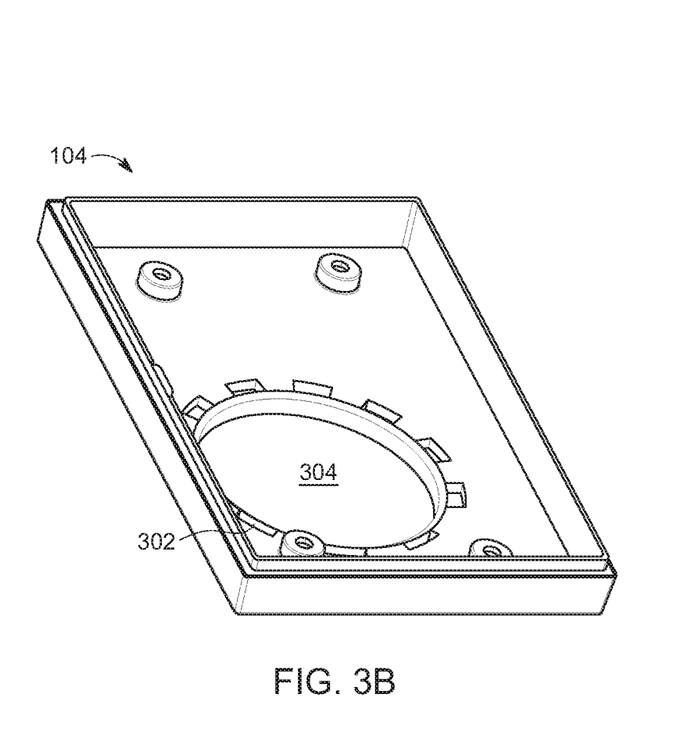

FIGS. 3A and 3B are diagrams of back and front views of the display backing 104, respectively. The view of the display backing 104 in FIG. 3A is a back view from the perspective of the back of the printing device 100 in FIG. 1, opposite the front at which the display 106 is viewable. Similarly, the view of the display backing 104 in FIG. 3B is a front view from the perspective of the front of the printing device 100 in FIG. 1.

The display backing 104 includes a backing circular structure 302 defined relative to an off-center hole 304 within the backing 104, rendering the display backing 104 an off-center such backing. The backing circular structure 302 in turn defines a slot 306. The backing circular structure 302 has multiple brackets 308 organized in a circular formation about the hole 204 and extending outward from the hole 204. The brackets 308 protrude away from the display backing 104, and are the part of the circular structure 302 that define the slot 306, which corresponds to the space between the brackets 308 and the backing 104. The brackets 308 are separated by multiple gaps 310, which can be referred to as bracket gaps.

The brackets 308 and the gaps 310 can vary in size along the angular direction about the backing circular structure 302, along the radial direction perpendicular to the angular direction, or along both the angular and radial directions. The keys 208 of the base circular structure 202 of FIGS. 2A and 2B can correspond in number and position to the gaps 310, and thus can vary in size in correspondence with size variation of the gaps 310 along the angular and/or radial direction. The brackets 308 of the backing circular structure 302 can correspond in number and position to the gaps 210 of the base circular structure 202 of FIGS. 2A and 2B, and thus can vary in size in correspondence with size variation of the gaps 210 along the angular and/or radial direction.

To attach the display backing 104 to the rotation base 102 of FIGS. 2A and 2B, the keys 208 of FIGS. 2A and 2B are aligned and inserted into the gaps 310 and the brackets 308 are aligned and inserted into the gaps 210 of FIGS. 2A and 2B, and the backing 104 then rotated relative to the base 102. The keys 208 and the brackets 308 can be respectively aligned to the gaps 310 and the gaps 210 at just one rotational orientation of the backing 104 relative to the base 102. At other rotational orientations, the keys 208 may not fit the gaps 310 and the brackets 308 may not fit into the gaps 210, so that the backing 104 is unlikely to separate from the base 102 during usage.

The rotational orientation at which the display backing 104 is aligned to the rotation base 102 of FIGS. 2A and 2B for attachment of the backing 104 to the base 102 (and thus for subsequent removal of the backing 104 from the base 102) may be an orientation at which the backing 104 is not rotated relative to the base 102 during normal usage. For example, in FIG. 1, the display backing 104 and the display 106 are rotatable 90 degrees clockwise from the portrait to landscape orientation, and 90 degrees counter-clockwise from the landscape to portrait orientation. The rotational orientation at which the backing 104 is aligned to the base 102 for attachment and removal may be at an orientation counter-clockwise from the portrait orientation, which is not an orientation through which the backing 104 rotates relative to the base 102 to switch between portrait and landscape orientations.

Once the display backing 104 has been attached to the rotation base 102, the tab 206 defined by the keys 208 in FIGS. 2A and 2B is rotatably disposed within the slot 306 defined by the protruding brackets 308. Rotation of the display backing 104 and the display 106 about the rotation base 102 can occur without separation of the backing 104 from the base 102 because the tab 206 remains rotatably disposed within the slot 306. Rotatable disposition of the tab 206 within the slot 306 secures the display backing 104 to the rotation base 102 after the backing 104 has been attached to the base 102. In one implementation, the radially shorter keys 208 can be angularly wide enough to overlap the radially longer, angularly narrower gaps 310 to provide for smoother rotation.

The display backing 104 includes a partial circular groove 312 concentric to the hole 304 and thus to the backing circular structure 302. The display backing 104 includes a pair of deeper stops 314 towards (such as at) opposing ends of the partial circular groove 312. The stops 314 are deeper in that they extend further into the display backing 104 than the partial circular groove 312. The protrusion 212 of FIG. 2A can correspond to the stops 314 in shape and depth.

The partial circular groove 312 corresponds to the range of rotation of the display backing 104 relative to the rotation base 102 of FIGS. 2A and 2B between portrait and landscape orientations. The deeper stops 314 define corresponding ends of this range of rotation. For example, one stop 314 corresponds to rotation of the display backing 104 and the display 106 relative to the rotation base 102 in the portrait orientation in FIG. 1, and the other stop 314 corresponds to rotation of the backing 104 and the display 106 relative to the base in the landscape orientation in FIG. 1.

The protrusion 212 of FIG. 2A movably fits within the partial circular groove 312 during normal usage, subsequent to attachment of the display backing 104 to the rotation base 102 of FIGS. 2A and 2B. The protrusion 212 fits into one stop 314 when the display backing 104 and the display 106 are rotated to the portrait orientation in FIG. 1, locking the backing 104 into the base 102 at this orientation. The protrusion 212 fits into the other stop 314 when the display backing 104 and the display 106 are rotated to the landscape orientation in FIG. 1, locking the backing 104 into the base 102 at this orientation. Movable fitment of the protrusion 212 within the partial circular groove 312 assists rotation of the display backing 104 relative to the rotation base 102 between the portrait and landscape orientations by guiding movement of the backing 104 relative to the base 102.

Figure 4A:
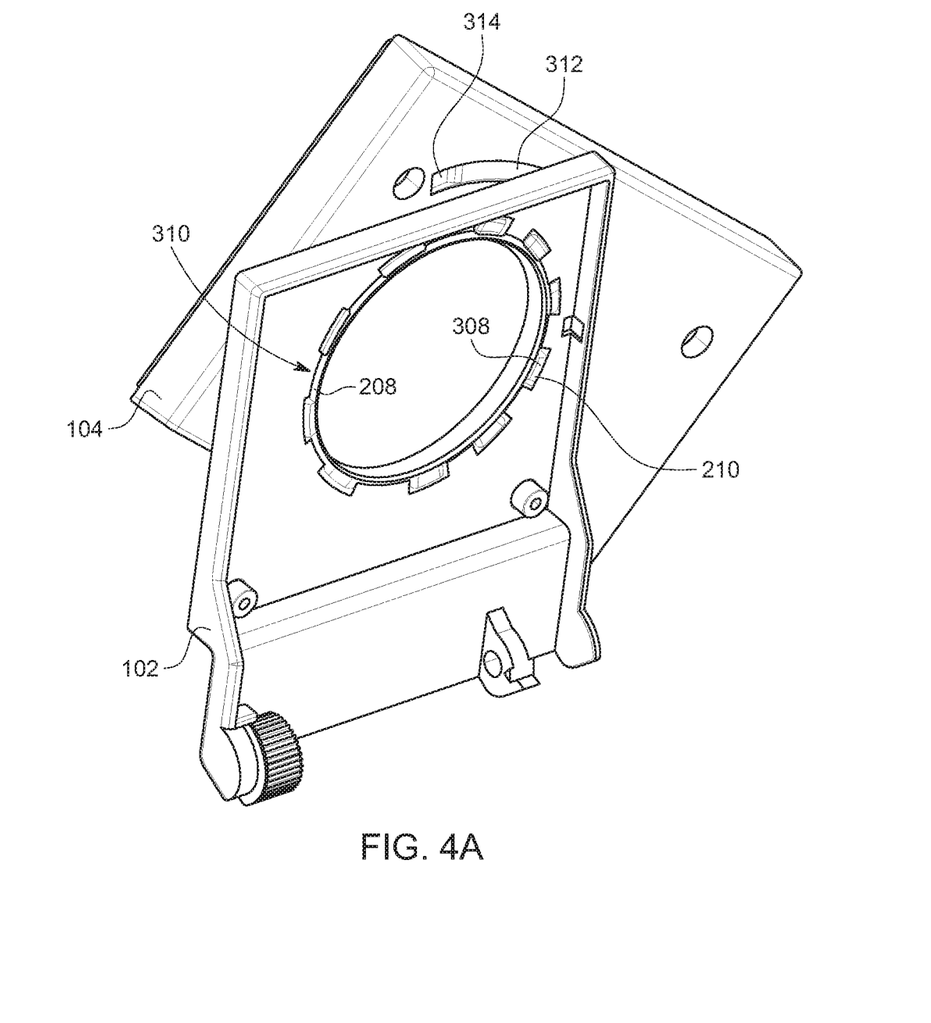
FIGS. 4A and 4B are diagrams of back and front views of the example backing of FIGS. 3A and 3B mating to the example rotation base of FIGS. 2A and 2B.
Figure 4B:
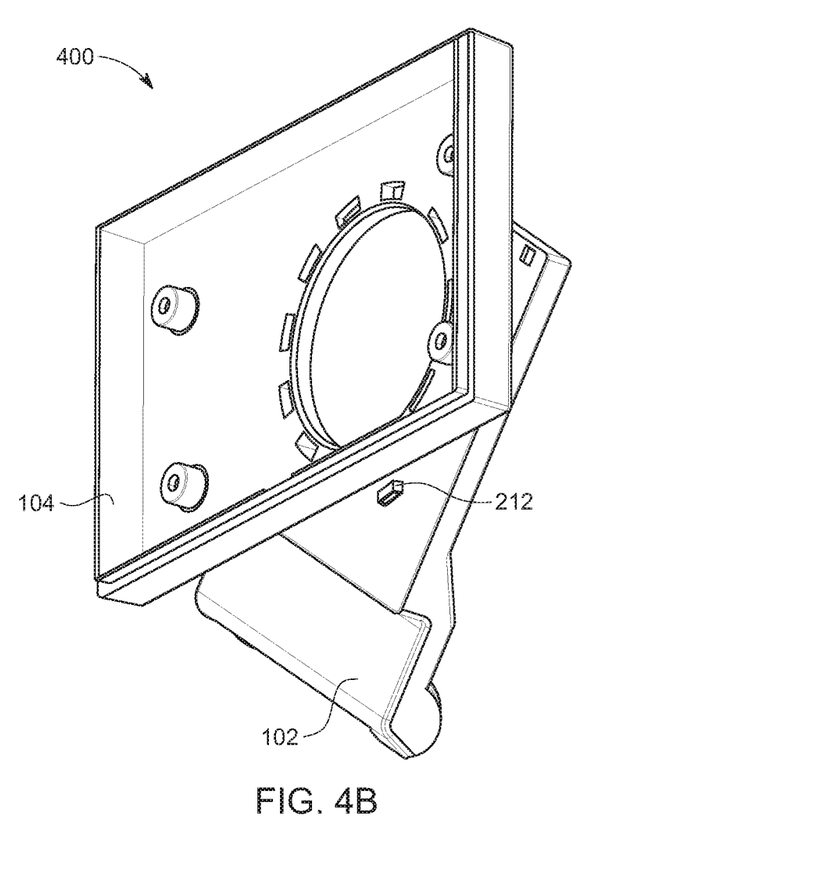

FIGS. 4A and 4B show back and front views of the example display backing 104 mating to the example rotation base 102. The rotational orientation of the display backing 104 relative to the rotation base 102 in FIGS. 4A and 4B is the orientation at which the backing 104 is attachable to and removable from the base 102. At this orientation of FIGS. 4A and 4B, the keys 208 of the rotation base 102 are aligned with and fit into the gaps 310 of the display backing 104, and the brackets 308 of the backing 104 are aligned with and fit into the gaps 210 of the base 102. The rotational orientation of FIGS. 4A and 4B corresponds to an orientation counterclockwise between 90 and 180 degrees from the portrait orientation of FIG. 1.

In the rotational orientation of the display backing 104 relative to the rotation base 102 in FIGS. 4A and 4B, the protrusion 212 of the base 102 is not yet fitted within the partial circular groove 312 of the backing 104. This is because the rotational orientation of FIGS. 4A and 4B is not an orientation through which the display backing 104 transitions relative to the rotation base 102 during normal usage (e.g., rotation between the portrait and landscape orientations of FIG. 1). In the orientation of FIGS. 4A and 4B, the protrusion 212 is similarly not in either deeper stop 314, since the display backing 104 is not rotated relative to the rotation base 102 in either the portrait or landscape orientation of FIG. 1.

Figure 5A:
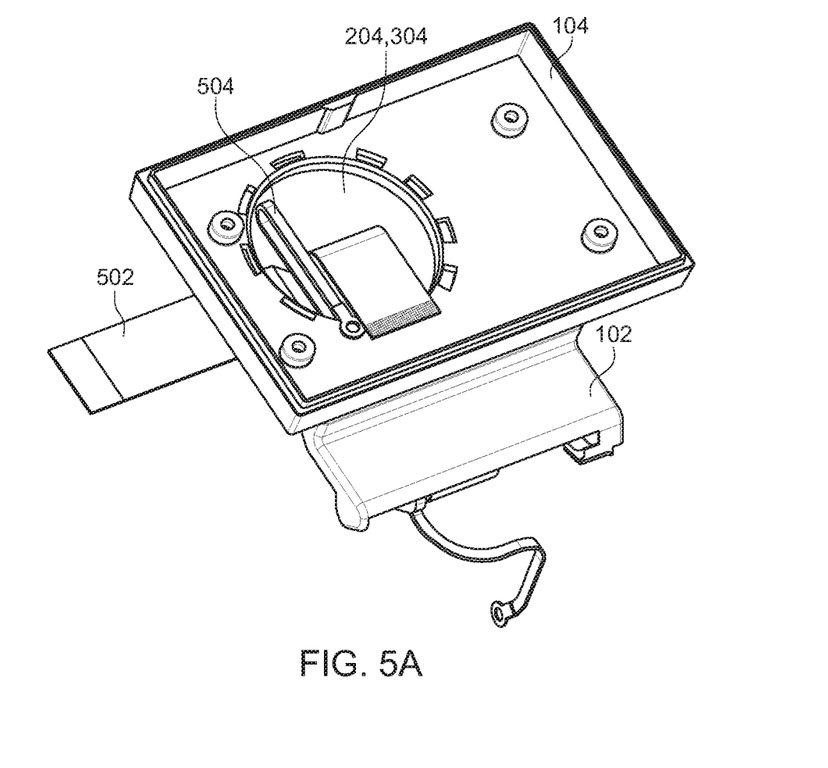
FIGS. 5A and 5B are diagrams of front views of the example backing of FIGS. 3A and 3B respectively rotated relative to the example rotation base of FIGS. 2A and 2B in landscape and portrait orientations, with an attached flexible flat cable and ground strap.
Figure 5B:
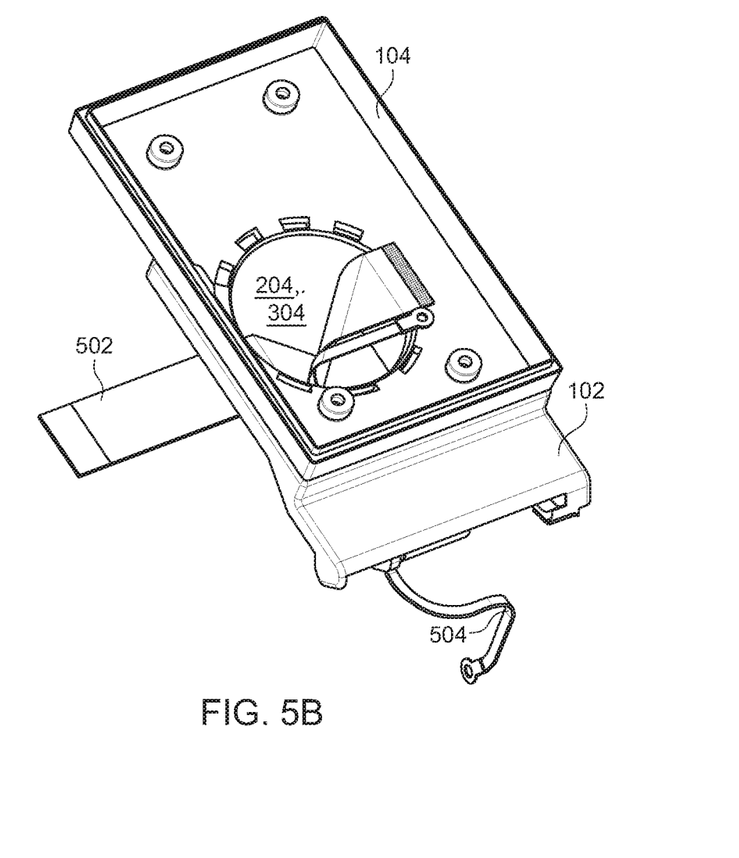

FIGS. 5A and 5B show front views of the example display backing 104 attached to the example rotation base 102. In FIG. 4A, the display backing 104 is rotated relative to the rotation base 102 in the landscape orientation of FIG. 1. In the landscape orientation, the display backing 104 is off center relative to the rotation base 102. In FIG. 4B, the display backing 104 is rotated relative to the rotation base 102 in the portrait orientation of FIG. 1. In the portrait orientation, the display backing 104 is centered relative to and aligned with the rotation base 102.

A flexible flat cable 502 and a ground strap 504 are depicted in FIGS. 5A and 5B. The flexible flat cable 502 and the ground strap 504 may be part of the printing device 100 of FIG. 1. The flexible flat cable 502 and the ground strap 504 are physically attached to the display backing 104 at ends of the cable 502 and the strap 504. The other ends of the flexible flat cable 502 and the ground strap 504 are to physically attach and electrically connect to corresponding points within the enclosure 110 of the printing device 100.

The flexible flat cable 502 is to make electrical contact with the display 106 of FIG. 1, such as via a corresponding cable or connector of the display 106. The ground strap 504 is to ground the display backing 104 and can also ground the display 106. The flexible flat cable 502 and the ground strap 504 are routed through the holes 204 and 304 of the rotation base 102 and the display backing 104. The flexible flat cable and the ground strap 504 have sufficient length and are suitably routed to not inhibit rotation of the display backing 104 relative to the rotation base 102.

Figure 6:
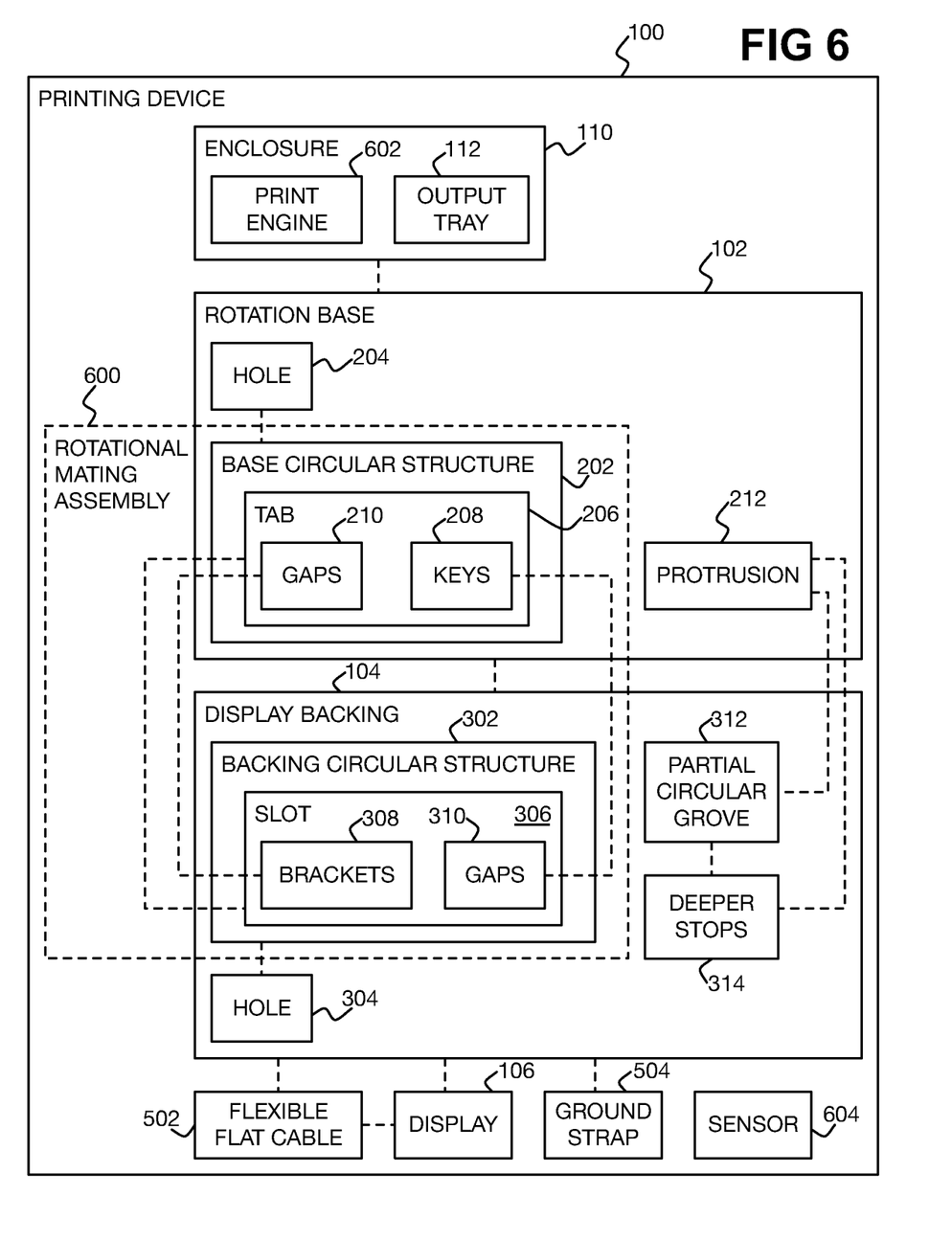
FIG. 6 is a block diagram of an example printing device including a rotatable display.

FIG. 6 shows a block diagram of the example printing device 100. The printing device 100 includes the rotation base 102, the display backing 104, the display 106, and the enclosure 110. The printing device 100 can include the flexible flat cable 502 and the ground strap 504. The printing device 100 can include a sensor 604 that detects a current rotational orientation of the display backing 104 relative to the rotation base 102, such as either the landscape or portrait orientation.

The printing device 100 can include the output tray 112 at the side of the enclosure 110 and that can be part of the enclosure 110. The printing device 100 can include a print engine 602 disposed within the enclosure 110. The print engine 602 includes the components of the printing device 100 by which the device 100 prints, such as on media advanced through the enclosure 110 and then output the output tray 112. The print engine 602 may be a laser print engine or an inkjet print engine, for instance.

The rotation base 102 can be extendably attached to the enclosure 110, which is indicated in FIG. 6 via a dotted line between the base 102 and the enclosure 110. The rotation base 102 includes the base circular structure 202 that is defined relative to the hole 204 of the base 102 as indicated by a dotted line between the circular structure 202 and the hole 204 in FIG. 6, and can also include the protrusion 212. The base circular structure 202 defines the tab 206. Specifically, the base circular structure 202 includes the keys 208 separated by the gaps 210 and that define the tab 206.

The display backing 104 is rotatably attachable to the rotation base 102, which is indicated in FIG. 6 via a dotted line between the backing 104 and the base 102. The display backing 104 includes the backing circular structure 302 that is defined relative to the hole 304 of the backing 104, as indicated by a dotted line between the circular structure 302 and the hole 304 in FIG. 6. The backing circular structure 302 defines the slot 306 into which the tab 206 of the base circular structure 202 is rotatably disposed, which is indicated by the dotted line between the slot 306 and the tab 206 in FIG. 6.

The backing circular structure 302 includes the brackets 308 separated by the gaps 310 and that specifically define the slot 306. The brackets 308 correspondingly fit into the gaps 210 of the base circular structure 202, which is indicated in FIG. 6 by a dotted line between the brackets 308 and the gaps 210, to attach the display backing 104 to the rotation base 102 and to remove the backing 104 from the base 102. Similarly, the keys 208 of the base circular structure 202 correspondingly fit into the gaps 310, which is indicated in FIG. 6 by a dotted line between the keys 208 and the gaps 310, to attach the display backing 104 to the rotation base 102 and to remove the backing 104 from the base 102.

The base circular structure 202 of the rotation base 102 and the backing circular structure 302 of the display backing 104 constitute a rotational mating assembly 600. The rotational mating assembly 600 can be used in an apparatus other than a printing device 100. The rotational mating assembly 600 permits rotation of a display 106 or other component attached to the display backing 104 of the printing device 100 or other apparatus to rotate between landscape and portrait orientations.

The display backing 104 can include the partial circular groove 312 and the deeper stops 314, which are positioned towards (including at) opposing ends of the groove 312, as indicated in FIG. 6 by a dotted line between the groove 312 and the stops 314. The protrusion 212 of the rotation base 102 movably fits within the partial circular groove 312, as indicated in FIG. 6 by a dotted line between the protrusion 212 and the circular groove 312, and can lock at either stop 314, as indicated in FIG. 6 by a dotted line between the protrusion 212 and the stops 314. The partial circular groove 312 corresponds to the range of rotation of the display backing 104 relative to the rotation base 102 during normal usage, between the landscape and portrait orientations. The deeper stops 314 correspond to the ends of this range of rotation of the rotation.

The flexible flat cable 502 is physically attached to the display backing 104, as indicated in FIG. 6 by a dotted line between the flat cable 502 and the backing 104. The flexible flat cable 502 is electrically connected to the display 106, as indicated in FIG. 6 by a dotted line between the cable 502 and the display 106. The ground strap 504 is physically attached to the display backing 104, as indicated in FIG. 6 by a dotted line between the strap 504 and the backing 104.

The sensor 604 may be a gyroscope sensor, a contact sensor, or another type of sensor. The sensor 604 may be able to affirmatively detect the display backing 104 in the landscape orientation and affirmatively detect the backing 104 in the portrait orientation. The sensor 604 may just be able to affirmatively detect the display backing 104 in the landscape orientation, such that it effectively detects the backing 104 in the portrait orientation when it is not in the landscape orientation. Similarly, the sensor 604 may just be able to affirmatively detect the display backing 104 in the portrait orientation, such that it effectively detects the backing 104 in the landscape orientation when it is not in the portrait orientation. The sensor 604 may be able to identify the precise orientation of the display backing 104 throughout its range of rotation.

Figure 7:
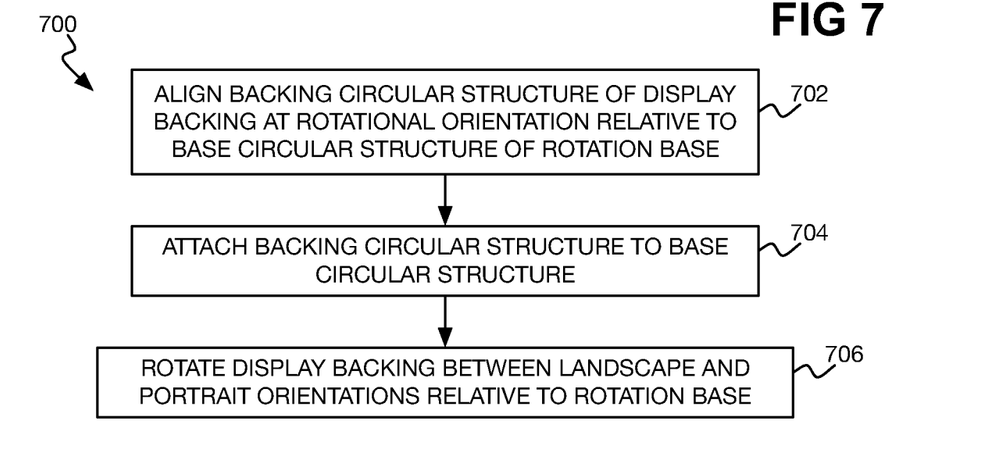
FIG. 7 is a flowchart of an example method.

FIG. 7 shows an example method 700. The method 700 can include aligning the backing circular structure 302 of a backing like the display backing 104 at a rotational orientation relative to the base circular structure 202 of the rotation base 102 at which the backing circular structure 302 is attachable to the base circular structure 202 (702). Such an alignment has been described with reference to FIGS. 4A and 4B. There may be just one rotational orientation of the backing circular structure 302 relative to the base circular structure 202 at which the structures 302 and 202 can be mated to one another.

The method 700 can include, upon alignment, attaching the backing circular structure 302 to the base circular structure 202 (704). The tab 206 defined by the base circular structure 202 becomes rotatably disposed within the slot 306 defined by the backing circular structure 302. The method 700 can then include rotating the (display) backing 104 between landscape and portrait orientations relative to the rotation base 102 (706), as permitted by rotatable attachment of the backing circular structure 302 to the base circular structure 202. Rotatable disposition of the tab 206 within the slot 306 secures the circular structures 202 and 302 together so that they do not become separated from one another after attachment and during rotation.

The method 700 has been described in relation to the backing 104, to which the display 106 can be attached. The method 700 can also be performed in relation to a different backing to which a component other than a display like the display 106 can be attached. Furthermore, the method 700 has been described in relation to the base circular structure 202 including the tab 206 and the backing circular structure 302 including the slot 306. The method 700 can also be performed in relation to a base circular structure that includes a slot and a backing circular structure including a tab rotatably disposable within the slot.

Figure 8:
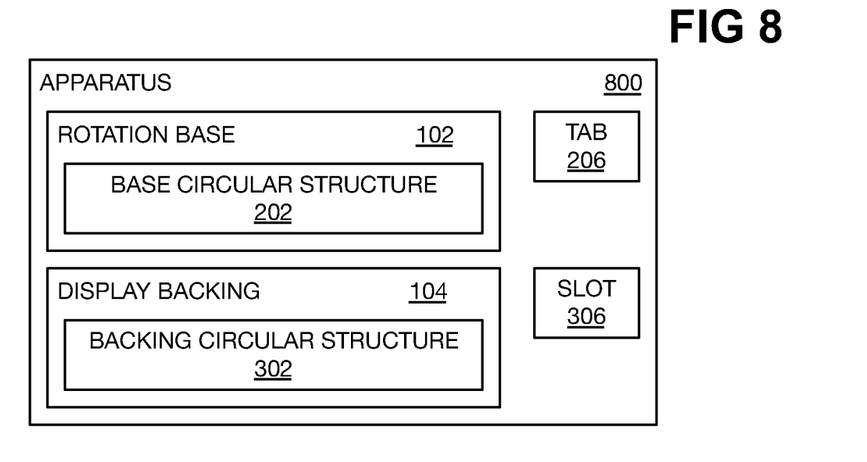
FIG. 8 is a block diagram of an example apparatus.

FIG. 8 shows a block diagram of an example apparatus 800, such as the described printing device 100. The apparatus 800 includes the rotation base 102 having the base circular structure 202. The apparatus 800 includes the display backing 104 having the backing circular structure 302, which is rotatably attached to the base circular structure 202 to permit the backing 104 to rotate between landscape and portrait orientations relative to the rotation base 102.

The apparatus 800 includes the tab 206 and the slot 306 in which the tab 206 is rotatably disposed. The tab 206 has been described as being part of and defined by the base circular structure 202 of the rotation base 102, and the slot 306 has been described as being part of and defined by the backing circular structure 302 of the display backing 104. However, in another implementation, the base circular structure 202 of the rotation base 102 can include and define the slot 306, and the backing circular structure 302 can include and define the tab 206 rotatably disposed within the slot 306.

Figure 9:
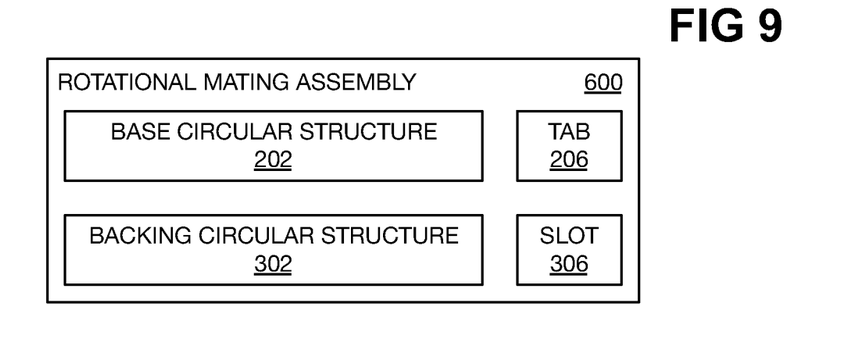
FIG. 9 is a block diagram of an example rotational mating assembly.

FIG. 9 shows a block diagram of the example rotational mating assembly 600. The rotational mating assembly 600 includes the base circular structure 202, which can be attachable to (or part of) a component like the enclosure 110 of the printing device 100. The mating assembly 600 includes the backing circular structure 302, which can be attachable to (or part of) another component like the display 106. The backing circular structure 302 is rotatably attached to the base circular structure 202 to permit the display 106 (or other component) to rotate relative to the enclosure 110 (or other component).

The rotational mating assembly 600 includes the tab 206 and the slot 306. The tab 206 has been described as being part of and defined by the base circular structure 202, and the slot 306 has been described as being part of defined by the backing circular structure 302. However, in another implementation, the base circular structure 202 can include and define the slot 306, and the backing circular structure 302 can include and define the tab 206 rotatably disposed within the slot 306.

Techniques have been described that provide for a rotational mating assembly by which a display or other component of a printing device or other apparatus can rotate between landscape and portrait orientations about a base. The rotational mating assembly is sufficiently robust to permit at least relatively infrequent such rotation. Furthermore, the rotational mating assembly may be manufactured at relatively low cost, permitting its inclusion in a wider variety of apparatuses that may benefit from such component rotation but which may heretofore have been cost prohibitive.

We claim:
1. An apparatus comprising:
   a rotation base having a base plate and a base circular structure defined by a hole extending therethrough, the base circular structure comprising a plurality of protruding brackets, organized in a circular formation extending inwardly from a peripheral edge thereof, separated by a plurality of bracket gaps, and a tab defined by the circular formation of the brackets;
   a display backing having a base plate and a backing circular structure extending therefrom, the backing circular structure comprising a plurality of keys corresponding to the bracket gaps, organized in a corresponding circular formation extending outwardly from a peripheral edge thereof, separated by a plurality of key gaps corresponding to the plurality of brackets, and a slot defined between the circular formation of the keys and the base plate;
   wherein the rotation base and the display backing are rotatably attached by the brackets and the keys being aligned and inserted through the key gaps and the bracket gaps such that the tab is rotatably disposed within the slot, and wherein the brackets, the keys, the bracket gaps, and the key gaps vary in size in a circumferential direction to permit removal and attachment of the display backing to the rotation base at one rotational orientation;
   a partial circular groove defined by one of the rotation base and the display backing and corresponding to a range of rotation of the display backing relative to the rotation base between landscape and portrait orientations; and a protrusion defined by the other of the rotation base and the display backing movably fitting within the partial circular groove;

wherein, in the orientation wherein the keys and corresponding key gaps align, the protrusion is not within the groove and the tab is rotated within the slot to a different rotational orientation to align and insert the protrusion within the partial circular groove.

2. The apparatus of claim 1, wherein the backing circular structure is defined relative to a hole within the display backing.

3. The apparatus of claim 2, wherein the backing circular structure is an off-center backing circular structure and the hole within the display backing is off center within the display backing, wherein in the landscape orientation the display backing is off center relative to the rotation base, and wherein in the portrait orientation the display backing is centered relative to the rotation base.

4. The apparatus of claim 1, wherein the brackets and the key gaps correspondingly vary in size along one or both of a radial direction and an angular direction perpendicular to the radial direction, and wherein the keys and the bracket gaps correspondingly vary in size along one or both of the radial direction and the angular direction.

5. The apparatus of claim 1, further comprising:
a pair of stops towards opposing ends of the partial circular groove deeper than the groove and defining corresponding ends of the range of rotation of the display backing relative to the rotation base between the landscape and portrait orientations.

6. The apparatus of claim 1, further comprising:
a display attached to the display backing.

7. The apparatus of claim 6, further comprising:
a flexible flat cable physically attached to the display backing to make electrical contact with the display; and
a ground strap physically attached to the display backing.

8. The apparatus of claim 1, further comprising:
a sensor to detect a current rotational orientation of the display backing relative to the rotation base.

9. The apparatus of claim 1, further comprising:
an enclosure to which the rotation base is extendably attached, wherein in the landscape orientation the display backing overhangs a side of the enclosure.

10. The apparatus of claim 9, wherein the apparatus is a printing device and further comprises:
a print engine disposed within the enclosure to print on media advanced through the enclosure; and
an output tray at a side of the enclosure opposite the side that the display backing overhangs in the landscape orientation.

11. A rotational mating assembly comprising:
a base circular structure defined by a hole extending through a base plate of a first component, the base circular structure comprising a plurality of protruding brackets, organized in a circular formation extending inwardly from a peripheral edge thereof, separated by a plurality of bracket gaps, and a tab defined by the circular formation of the brackets;
a backing circular structure extending from a base plate of a second component, the backing circular structure comprising a plurality of keys corresponding to the bracket gaps, organized in a corresponding circular formation extending outwardly from a peripheral edge thereof, separated by a plurality of key gaps corresponding to the plurality of brackets, and a slot defined between the circular formation of the keys and the base plate;

wherein the first component and the second component are rotatably attached by the brackets and the keys being aligned and inserted through the key gaps and the bracket gaps such that the tab is rotatably disposed within the slot, and wherein the brackets, the keys, the bracket gaps, and the key gaps vary in size in a circumferential direction to permit removal and attachment of the display backing to the rotation base at one rotational orientation;

a partial circular groove defined by one of the first component and the second component and corresponding to a range of rotation of the second component relative to the first component between landscape and portrait orientations; and a protrusion defined by another of the first component and the second component, and movably fitting within the partial circular groove;

wherein, in the orientation wherein the keys and corresponding key gaps align, the partial circular groove is not aligned with the protrusion and the tab is rotated within the slot to a different rotational orientation to align and insert the protrusion within the partial circular groove.

12. A method comprising:
providing a rotation base having a base plate and a base circular structure defined by a hole extending therethrough, the base circular structure comprising a plurality of protruding brackets, organized in a circular formation extending inwardly from a peripheral edge thereof, separated by a plurality of bracket gaps, and a tab defined by the circular formation of the brackets;
providing a display backing having a base plate and a backing circular structure extending therefrom, the backing circular structure comprising a plurality of keys corresponding to the bracket gaps, organized in a corresponding circular formation extending outwardly from a peripheral edge thereof, separated by a plurality of key gaps corresponding to the plurality of brackets, and a slot defined between the circular formation of the keys and the base plate;
providing a partial circular groove defined by one of the rotation base and the display backing and corresponding to a range of rotation of the display backing relative to the rotation base between landscape and portrait orientations;
providing a protrusion defined by the other of the rotation base and the display backing movably fitting within the partial circular groove;
aligning the backing circular structure of the display backing at a rotational orientation relative to the base circular structure of the rotation base at which the backing circular structure is rotatably attachable to the base circular structure, wherein the rotation base and the display backing are rotatably attached by the brackets and the keys being aligned and inserted through the key gaps and the bracket gaps such that the tab is rotatably disposed within the slot and wherein the brackets, the keys, the bracket gaps, and the key gaps vary in size in a circumferential direction to permit removal and attachment of the display backing to the rotation base at one rotational orientation;
rotating the display backing relative to the rotation base to a different rotational orientation to align and movably fit the protrusion within the partial circular groove; and
rotating the display backing between the landscape and portrait orientations relative to the rotation base, as permitted by rotatable attachment of the backing circular structure to the base circular structure.

* * * * *